(12) United States Patent
Treybig et al.

(10) Patent No.: US 7,417,011 B2
(45) Date of Patent: Aug. 26, 2008

(54) METHOD AND COMPOSITION FOR RECOVERING HYDROCARBON FLUIDS FROM A SUBTERRANEAN RESERVOIR

(75) Inventors: Duane Treybig, Sugar Land, TX (US); Kin-Tai Chang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 652 days.

(21) Appl. No.: 10/661,669

(22) Filed: Sep. 12, 2003

(65) Prior Publication Data

US 2006/0189488 A1    Aug. 24, 2006

(51) Int. Cl.
    *E21B 43/16* (2006.01)
    *E21B 33/00* (2006.01)
(52) U.S. Cl. ............... 507/244; 166/305.1; 507/219
(58) Field of Classification Search ........ 507/244, 507/219; 166/305.1
    See application file for complete search history.

(56) References Cited

U.S. PATENT DOCUMENTS

| | | | |
|---|---|---|---|
| 3,349,053 A | 10/1967 | Ashby | |
| 3,350,325 A | 10/1967 | Ashby | |
| 4,396,499 A * | 8/1983 | McCoy et al. | 208/188 |
| 4,417,048 A * | 11/1983 | Soula et al. | 544/38 |
| 4,460,627 A | 7/1984 | Weaver et al. | |
| 4,532,052 A | 7/1985 | Weaver et al. | |
| 4,617,132 A | 10/1986 | Dalrymple et al. | |
| 4,830,827 A * | 5/1989 | Au et al. | 422/7 |
| 5,275,853 A | 1/1994 | Silvis et al. | |
| 5,464,924 A | 11/1995 | Silvis et al. | |
| 5,648,409 A | 7/1997 | Arora et al. | |
| 5,760,108 A * | 6/1998 | Arora et al. | 523/404 |
| 5,773,405 A * | 6/1998 | Bruhnke | 510/419 |
| 5,834,078 A | 11/1998 | Cavitt et al. | |
| 5,977,286 A * | 11/1999 | Marten et al. | 528/120 |
| 6,569,983 B1 * | 5/2003 | Treybig et al. | 528/102 |
| 2003/0008781 A1 * | 1/2003 | Gupta et al. | 507/240 |

FOREIGN PATENT DOCUMENTS

WO    WO 03/053536 A1    3/2003

OTHER PUBLICATIONS

Schlumberger Dictionary Entry for "clay".*

* cited by examiner

*Primary Examiner*—Randy Gulakowski
*Assistant Examiner*—Alicia M Toscano
(74) *Attorney, Agent, or Firm*—Michael B. Martin

(57) ABSTRACT

A method of modifying the permeability to water of a subterranean formation comprising injecting into the subterranean formation an aqueous composition comprising from about 0.005 percent to about 2 percent, by weight, of a water-soluble alkylene oxide branched polyhydroxyetheramine or a salt thereof, wherein the alkylene oxide branched polyhydroxyetheramine is prepared by reacting a diepoxide with one or more alkylene oxide functionalized amines and one or more amines having two reactive hydrogen atoms and optionally reacting the resulting polyhydroxyetheramine with an acid or alkylating agent to form the salt.

15 Claims, No Drawings

METHOD AND COMPOSITION FOR RECOVERING HYDROCARBON FLUIDS FROM A SUBTERRANEAN RESERVOIR

TECHNICAL FIELD

This invention provides compounds, compositions and methods for the recovery of hydrocarbon fluids from a subterranean reservoir. More particularly, this invention concerns water-soluble alkylene oxide branched polyhydroxyetheramines that modify the permeability of subterranean formations and increase the mobilization and/or recovery rate of hydrocarbon fluids present in the formations.

BACKGROUND OF THE INVENTION

The production of large amounts of water from oil and gas wells constitutes one of the major expenses in the overall recovery of hydrocarbons from a subterranean formation. Many producing oil wells produce a gross effluent having greater than 80% by volume water. Therefore, most of the pumping energy is expended by lifting water from the well. Then the production effluent must be subjected to expensive separation procedures in order to recover water-free hydrocarbons. The water constitutes a troublesome and an expensive disposal problem.

Therefore, it is highly desirable to decrease the amount of water produced from oil and gas wells. Another beneficial effect of decreasing the amount of produced water is realized by decreasing the flow of water in the well bore at a given pumping rate thereby lowering the liquid level over the pump in the well bore, thereby reducing the back pressure in the formation and improving pumping efficiency and net daily oil production.

SUMMARY OF THE INVENTION

We have discovered a family of novel alkylene oxide branched polyhydroxyetheramine polymers that effectively reduce the amount of water recovered from subterranean, hydrocarbon-bearing formations, thereby increasing the production rate of hydrocarbons from the formation. The polymers of this invention are particularly effective at decreasing the water permeability with little effect on the oil permeability. Ester comb polymers decrease the water permeability but also significantly reduce the oil permeability. The polymers of this invention are also particularly effective for use in gas and oil wells that operate at temperatures higher than about 200° F. where polymers such as polyacrylamide (PAM), hydrolyzed polyacrylamide (HPAM) and ester-containing polymers are less effective due to hydrolysis of the ester or amide functionality.

Accordingly, this invention is a method of modifying the permeability to water of a subterranean formation comprising injecting into the subterranean formation an aqueous composition comprising from about 0.005 percent to about 2 percent, by weight, of a water-soluble alkylene oxide branched polyhydroxyetheramine or a salt thereof, wherein the alkylene oxide branched polyhydroxyetheramine is prepared by reacting a diepoxide with one or more alkylene oxide functionalized amines and one or more amines having two reactive hydrogen atoms and optionally reacting the resulting polyhydroxyethermaine with an acid or alkylating agent to form the salt.

DETAILED DESCRIPTION OF THE INVENTION

"Acyl" means a group of formula R'C(O)— where R' is $C_1$-$C_8$ alkyl. $C_1$-$C_2$ alkyl groups are preferred. Representative acyl groups include acetyl, propionyl, butyryl, and the like.

"Alkoxy" means a $C_1$-$C_8$ alkyl group attached to the parent molecular moiety through an oxygen atom. Representative alkoxy groups include methoxy, ethoxy, propoxy, butoxy, and the like. Methoxy and ethoxy are preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkylamido" means a group of formula R'NHC(O)— where R' is $C_1$-$C_8$ alkyl. $C_1$-$C_2$ alkyl groups are preferred.

"Alkylcarbonyl" means a $C_2$-$C_8$ alkyl group where the alkyl chain is interrupted with a carbonyl (>C=O) group (i.e. an alkyl-C(O)-alkylene-group). Representative alkylcarbonyl groups include methylcarbonymethyl, ethylcarbonylmethyl, methylcarbonylethyl, (2-methylpropyl)carbonylmethyl, and the like.

"Alkylene" means a divalent group derived from a straight or branched chain saturated hydrocarbon by the removal of two hydrogen atoms, for example methylene, 1,2-ethylene, 1,1-ethylene, 1,3-propylene, 2,2-dimethylpropylene, and the like.

"Alkylene oxide functionalized amine" means an amine having two reactive N—H groups as defined herein and further comprising one or more groups of formula —(AO)— where A is straight or branched $C_1$-$C_4$ alkyl. Representative alkylene oxide functionalized amines include 2-(2-aminoethoxyethanol), 2-2(aminoethylamino)ethanol, methoxypoly(oxyethylene/oxypropylene)-2-propylamine (XT J-505, XT J-506, XT J 507 and Jeffamine M-2070), and the like. XT J-505, XT J-506, XT J 507 and Jeffamine M-2070 are available from Huntsman Corporation, Houston, Tex.

"Amine having two reactive hydrogen atoms" means an amine having two reactive hydrogen atoms, where the hydrogen atoms are sufficiently reactive to react with the epoxide groups of a diepoxide as defined herein to form a polyhydroxyetheramine. The amine having two reactive hydrogen atoms may be a primary amine, or a compound containing two secondary amino groups, where the compound containing two secondary amino groups may be cyclic or acyclic. The amine having two reactive hydrogen atoms is optionally substituted with one or more with alkylamido, dialkylamino, hydroxy, hydroxyalkyl, alkoxy, halo, cyano, aryloxy, alkylcarbonyl or arylcarbonyl groups.

"Aryl" means substituted and unsubstituted aromatic carbocyclic radicals and substituted and unsubstituted aromatic heterocyclic radicals having from 5 to about 14 ring atoms. Representative carbocyclic aryl include phenyl, naphthyl, phenanthryl, anthracyl, fluorenyl, and the like. Representative aromatic heterocyclic radicals include pyridyl, furyl, pyrrolyl, quinolyl, thienyl, thiazolyl, pyrimidyl, indolyl, and the like. The aryl is optionally substituted with one or more alkylamido, hydroxy, alkoxy, halo, cyano, aryloxy, alkylcarbonyl or arylcarbonyl groups.

"Arylalkyl" means an aryl group attached to the parent molecular moiety through a $C_1$-$C_8$ alkylene group. $C_1$-$C_2$ alkylene groups are preferred. Representative arylalkyl groups include phenylmethyl, phenylethyl, phenylpropyl, 1-naphthylmethyl, and the like.

"Arylcarbonyl" means an aryl group attached to the parent molecular moiety through a carbonyl group. Representative arylcarbonyl include benzoyl and substituted benzoyl.

"Aryloxy" means an aryl group attached to the parent molecular moiety through an oxygen atom. Representative aryloxy groups include phenoxy, pyridyloxy, and the like.

"Cycloalkylene" means a divalent group derived from a saturated carbocyclic hydrocarbon by the removal of two hydrogen atoms, for example cyclopentylene, cyclohexylene, and the like.

"Dialkylamino" means a group having the structure —NR'R" wherein R' and R" are independently selected from $C_1$-$C_8$ alkyl. $C_1$-$C_2$ alkyl are preferred. Additionally, R' and R" taken together may optionally be —$(CH_2)_k$— where k is an integer of from 2 to 6. Examples of dialkylamino include, dimethylamino, diethylaminocarbonyl, methylethylamino, piperidino, and the like.

"Diepoxide" means a cyclic or acyclic compound containing two epoxide groups. Representative diepoxides include diglycidyl esters of diacids, diglycidyl ethers of diols, diglycidyl ethers of polyols, epoxidized olefins, diglycidyl ethers of a polyhydric phenols, and the like.

"Diglycidyl ester of a diacid" means a diepoxide of formula

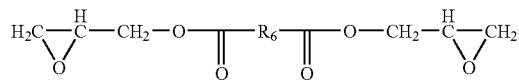

where $R_6$ is $C_2$-$C_{36}$ alkylene or $C_5$-$C_8$ cycloalkylene, where the alkylene is optionally interrupted with a cylcloalkylene group, and where the alkylene or cycloalkylene is optionally substituted with one or more alkylamido, hydroxy, alkoxy, halo, cyano, aryloxy, alkylcarbonyl or arylcarbonyl groups. A preferred diglycidyl ester of a diacid is diglycidyl ether of dimer acid.

"Diglycidyl ether of a diol" means a compound of formula

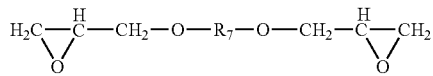

where $R_7$ is $C_2$-$C_{20}$ alkylene or $C_2$-$C_{40}$ alkoxy, where the alkylene is optionally interrupted with a cycloalkylene group and the alkylene or alkoxy is optionally substituted with one or more alkylamido, hydroxy, alkoxy, halo, cyano, aryloxy, alkylcarbonyl or arylcarbonyl groups. Preferred diglycidyl ethers of a diol include bis(2,3-epoxypropyl)ether, diglycidyl ether of 1,4-butanediol, diglycidyl ether of neopentyl glycol, diglycidyl ether of ethylene glycol, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, and the like.

"Diglycidyl ether of a polyol" means a compound of formula

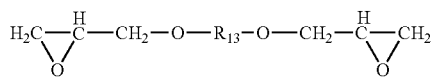

where $R_{13}$ is aryl or $C_2$-$C_{40}$ alkylene where the aryl or alkylene is substituted with one or more hydroxy groups. Representative diglycidyl ethers of a polyol include diglycidyl ether of glycerol, diglycidyl ether of sorbitol, diglycidyl ether of trimethyolpropane and diglycidyl ether of pentaerythritol, and the like.

"Epoxidized olefin" means a compound of formula

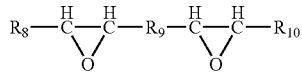

where $R_9$ is $C_2$-$C_{20}$ alkylene, where the alkylene is optionally interrupted with a cylcloalkylene group and optionally substituted with one or more alkylamido, hydroxy, alkoxy, halo, cyano, aryloxy, alkylcarbonyl or arylcarbonyl groups and $R_8$ and $R_{10}$ are H or $R_8$ and $R_{10}$ are connected through a valence bond to form a $C_6$-$C_{20}$ cycloalkyl. Representative epoxidized olefins include 1,2,3,4-diepoxybutane; 1,2,7,8-diepoxyoctane, 1,2,9,10-diepoxydecane, 1,2,5,6-diepoxycyclooctane, and the like.

"Diglycidyl ether of a polyhydric phenol" means a compound of formula

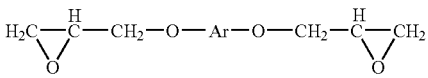

wherein —Ar— is selected from —$R_{11}$—, —$R_{11}$—$R_{12}$—, and —$R_{11}$—L—$R_{12}$—; L is selected from $C_1$-$C_4$ alkylene, —$SO_2$—; —S—; —S—S—; —(C=O); and —O—; and $R_{11}$ and $R_{12}$ are carbocyclic aryl wherein the carbocyclic aryl is optionally substituted with one or more groups selected from $C_1$-$C_4$ alkyl and halogen. Representative diglycidyl ethers of polyhydric phenols include the diglycidyl ethers of resorcinol; catechol; hydroquinone; 4,4'-isopropylidine bisphenol (bisphenol A); bis(4-hydroxyphenyl)methane (bisphenol F); bisphenol E; 4,4'-dihydroxybenzophenone (bisphenol K); 4,4'-dihydroxydiphenyl sulfide; 4,4'-dihydroxydiphenyl sulfone (bisphenol S); 4,4'-thiodiphenol; 2,6-dihydroxynaphthalene; 1,4'-dihydroxynapthalene; 9,9-bis(4-hydroxyphenyl)fluorene; dihydroxy dinitrofluorenylidene; diphenylene; 2,2-bis(4-hydroxyphenyl)-acetamide; 2,2-bis(4-hydroxyphenyl)ethanol; 2,2-bis(4-hydroxyphenyl)-N-methylacetamide; 2,2-bis(4-hydroxyphenyl)-N,N-dimethylacetamide; 3,5-dihydroxyphenyl-acetamide; 2,4-dihydroxyphenyl-N-(hydroxyethyl)-acetamide; 2,2-bistris-hydroxyphenyl methane; 2,6,2',6'-tetrabromo-p,p'-bisphenol A; 2,6,2',6'-tetramethyl-3,5,3'-tribromo-p,p'-biphenol; 2,6,2',6'-tetramethyl-3,5,3'5'-tetrabromo-p,p'-biphenol; tetramethylbiphenol; 4,4'-dihydroxydiphenylethylmethane; 3,3'-dihydroxydiphenyldiethylmethane; 3,4'-dihydroxydiphenylmethylpropylmethane; 4,4'-dihydroxydiphenyloxide; 4,4'-dihydroxydiphenylcyanomethane; and the dihydric phenols listed in U.S. Pat. Nos. 3,395,118; 4,438,254; and 4,480,082, incorporated herein by reference.

"alo" and "halogen" mean chlorine, fluorine, bromine and iodine.

"Hydroxyalkyl" means a $C_1$-$C_8$ alkyl substituted by one to three hydroxyl groups with the proviso that no more than one hydroxy group may be attached to a single carbon atom of the alkyl group. Representative hydroxyalkyl include hydroxyethyl, 2-hydroxypropyl, and the like.

"Salt" means the quaternary ammonium salt resulting from quaternization of one or more NH groups in the water-soluble polyhydroxyetheramine of this invention with acid or an alkylating agent as described herein.

"Triepoxide" means an acyclic compound containing three epoxide groups. Representative triepoxides include trimethyol propane triglycidyl ether, polyglycidyl ether of castor oil, polyglycidyl ether of an aliphatic polyol, and the like.

PREFERRED EMBODIMENTS

The water-soluble alkylene oxide branched polyhydroxyetheramines used in this invention are prepared by reacting a diepoxide with one or more alkylene oxide functionalized amines and one or more amines having two reactive hydrogen atoms under conditions sufficient to cause the amino groups of the alkylene oxide functionalized amines and amines having two reactive hydrogen atoms to react with the epoxide groups of the diepoxide to form a polyhydroxyetheramine having pendant alkylene oxide groups. The preparation of polyhydroxyetheramines is described in U.S. Pat. Nos. 5,275,853 and 5,464,924, incorporated herein by reference.

Water-soluble alkylene oxide branched polyhydroxyetheramines are available in solid form, in 10 to 50 weight percent aqueous solution from The Dow Chemical Company, Midland, Mich.

In an aspect of this invention, the amine having two reactive hydrogen atoms as defined herein may be used as a mixture with one or more fatty amines to prepare the polyhydroxyetheramine. Representative fatty amines include hexylamine, heptylamine, octylamine, nonylamine, decylamine, undecylamine, dodecylamine, tridecylamine, tetradecylamine, hexadecylamine, octadecylamine, 13-docosen-1-amine (erucylamine), and the like.

In another aspect of this invention, amines having more than two reactive hydrogen atoms such as diamines, triamines and other polyamines can be mixed with the alkylene oxide functionalized amines and amines having two reactive hydrogen atoms to provide crosslinking or branching. Suitable amines having more than two reactive hydrogen atoms include ethylenediamine, diethylenetriamine, N-(2-aminoethyl)piperazine, triethylenetetramine, tetraethylenepentamine, 1,3-diaminopropane, 1,4-diaminobutane, and the like.

Accordingly, in a preferred aspect of this invention, the water-soluble alkylene oxide branched polyhydroxyetheramine is prepared by reacting a mixture of diepoxide and one or more aliphatic or aromatic triepoxides with one or more alkylene oxide functionalized amines and one or more amines having two reactive hydrogen atoms.

In another preferred aspect, the water-soluble alkylene oxide branched polyhydroxyetheramine salt is prepared by reacting a mixture of diepoxide and one or more aliphatic or aromatic triepoxides, one or more alkylene oxide functionalized amines and one or more amines having two reactive hydrogen atoms and then an acid or alkylating agent.

In another aspect of this invention, alkylene oxide functionalized amines having more than two reactive hydrogen atoms can be mixed with the alkylene oxide functionalized amines to provide crosslinking or branching. Suitable alkylene oxide functionalized amines having more than two reactive N—H groups include α-(2-aminomethylethyl)-o-(2-aminomethylethyloxy)poly(oxy(methyl-1,2-ethanediyl)) (Jeffamine D-400, D-230 and D-2000), polyoxypropylene diamine (XTJ-510), and the like. XTJ-510 and Jeffamine D-400, D-230 and D-2000 are available from Huntsman Corporation, Houston, Tex.

In another aspect of this invention, aliphatic or aromatic triepoxides can be mixed with the diepoxide to provide crosslinking. Suitable aliphatic or aromatic triepoxides are trimethyol propane triglycidyl ether, polyglycidyl ether of castor oil and polyglycidyl ether of an aliphatic polyol.

The presence of secondary amine, tertiary amine or ditertiary amine end groups in the polyhydroxyetheramine is preferred as opposed to an epoxide end group in order to improve solubility in water and alcohol solvents and prevent continuing reaction.

Secondary amine end groups are obtained from the reaction of the remaining unreacted epoxide groups with the above amines having two reactive hydrogens at a concentration of 2 to 5 mole percent excess amine.

Tertiary amine end groups are obtained by reacting the unreacted epoxide groups with amines having one available amino hydrogen such as diethanolamine, diisopropanolamine, N-methyl-D-glucamine, N-methylpropylamine, dimethylamine, diethylamine, dipropylamine, diisopropylamine and the like.

Ditertiary amine end groups are obtained by reacting the unreacted epoxide groups with amines having one available amino hydrogen substituted with a tertiary amine group such as N,N,N'-trimethyl-1,3-propanediamine, N,N,N'-trimethylethylenediamine, N,N-dimethyl-N'-ethylethylenediamine, N,N,N'-triethylethylenediamine, N-methylpiperazine, and the like.

Accordingly, in a preferred aspect of this invention, the water-soluble alkylene oxide branched polyhydroxyetheramine comprises secondary amine, tertiary amine or ditertiary amine end groups.

In another preferred aspect, the water-soluble alkylene oxide branched polyhydroxyetheramine comprising secondary amine, tertiary amine or ditertiary amine end groups is prepared by reacting a diepoxide with one or more alkylene oxide functionalized amines and one or more amines having two reactive hydrogen atoms to form the water-soluble alkylene oxide branched polyhydroxyetheramine and then reacting the water-soluble alkylene oxide branched polyhydroxyetheramine with one or more amines having one or two reactive hydrogen atoms.

In another preferred aspect, the water-soluble alkylene oxide branched polyhydroxyetheramine comprising secondary amine, tertiary amine or ditertiary amine end groups is prepared by reacting a diepoxide with one or more alkylene oxide functionalized amines and one or more amines having two reactive hydrogen atoms and an amine having 3 or more reactive hydrogen atoms to form the water-soluble alkylene oxide branched polyhydroxyetheramine and then reacting the water-soluble alkylene oxide branched polyhydroxyetheramine with one or more amines having one or two reactive hydrogen atoms.

In another preferred aspect, this invention is a water-soluble alkylene oxide branched polyhydroxyetheramine salt comprising secondary amine, tertiary amine or ditertiary amine end groups prepared by reacting a diepoxide with one or more alkylene oxide functionalized amine and one or more amines having 2 reactive hydrogen atoms and then reacting the resulting polyhydroxyetheramine with one or more amines having one or two reactive hydrogen atoms followed by an acid or alkylating agent.

In another preferred aspect, this invention is a water-soluble alkylene oxide branched polyhydroxyetheramine salt comprising secondary amine, tertiary amine or ditertiary amine end groups prepared by reacting a diepoxide with one or more alkylene oxide functionalized amine, one or more amines having 2 reactive hydrogen atoms and an amine having 3 or more reactive hydrogen atoms and then reacting the resulting polyhydroxyetheramine with one or more amines having one or two reactive hydrogen atoms followed by an acid or alkylating agent.

In a preferred aspect of this invention, the alkylene oxide functionalized amine is selected from the group consisting of amines of formula (a)-(d)

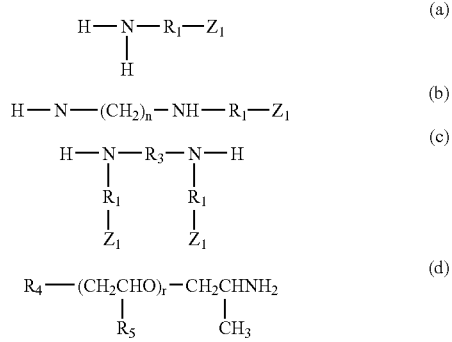

wherein $R_1$ is independently selected at each occurrence from a group of formula $(-CH_2-CH_2-O-)_p$ and a group of formula $(-CH_2-CH(CH_3)-O-)_q$ or a mixture thereof; $R_3$ is $C_2-C_{20}$ alkylene optionally substituted with alkylamido, hydroxy, alkoxy, halo, cyano, aryloxy, alkylcarbonyl or arylcarbonyl; $R_4$ is alkoxy; $R_5$ is H or $-CH_3$; $Z_1$ is hydrogen, $C_1-C_7$ alkyl or acyl; and n, p, q and r are independently integers of 1 to about 45.

Amines of formula (a)-(d) are commercially available from a variety of sources including Aldrich Chemicals, Milwaukee, Wis.; Dow Chemical Company, Midland, Mich.; Huntsman Corporation, Houston, Tex.; and others.

In another preferred aspect, $R_3$ is $C_2-C_{20}$ alkylene optionally substituted with alkylamido, dialkylamino, hydroxy or alkoxy.

In another preferred aspect, $Z_1$ is independently selected at each occurrence from hydrogen, $C_1-C_7$ alkyl and acyl.

In another preferred aspect, the diepoxide is selected from the group consisting of diglycidyl esters of diacids, diglycidyl ethers of diols, diglycidyl ethers of polyols and epoxidized olefins.

In another preferred aspect, the diglycidyl esters of diacids, diglycidyl ethers of diols, diglycidyl ethers of polyols and epoxidized olefins are selected from the group consisting of diglycidyl ether of dimer acid, bis(2,3-epoxypropyl)ether, diglycidyl ether of 1,4-butanediol, diglycidyl ether of neopentyl glycol, diglycidyl ether of ethylene glycol, diglycidyl ether of glycerol, diglycidyl ether of trimethylolpropane, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane; 1,2,7,8-diepoxyoctane, 1,2,9,10-diepoxydecane, 1,2,5,6-diepoxycyclooctane and the like.

In another preferred aspect, the diglycidyl ether of a diol is diglycidyl ether of neopentyl glycol.

In another preferred aspect, the diglycidyl ethers of polyols are selected from diglycidyl ethers of glycerol.

In another preferred aspect, the epoxidized olefin is 1,2,3,4-diepoxybutane.

In another preferred aspect, the diglycidyl ester of a diacid is diglycidyl ether of dimer acid.

In another preferred aspect, the diepoxide is selected from the group consisting of diglycidyl ethers of polyhydric phenols.

In another preferred aspect, the diglycidyl ether of a polyhydric phenol is selected from diglycidyl ethers of resorcinol; catechol; hydroquinone; bisphenol A; bisphenol F; bisphenol E; bisphenol K; 4,4'-dihydroxydiphenyl sulfide; bisphenol S; 4,4'-thiodiphenol; 2,6-dihydroxynaphthalene; 1,4'-dihydroxynapthalene; 9,9-bis(4-hydroxyphenyl)fluorene; dihydroxy dinitrofluorenylidene; diphenylene; 2,2-bis(4-hydroxyphenyl)-acetamide; 2,2-bis(4-hydroxyphenyl)ethanol; 2,2-bis(4-hydroxyphenyl)-N-methylacetamide; 2,2-bis(4-hydroxyphenyl)-N,N-dimethylacetamide; 3,5-dihydroxyphenyl-acetamide; 2,4-dihydroxyphenyl-N-(hydroxyethyl)-acetamide; 2,2-bistris-hydroxyphenyl methane; 2,6,2',6'-tetrabromo-p,p'-bisphenol A; 2,6,2',6'-tetramethyl-3,5,3'-tribromo-p,p'-biphenol; 2,6,2',6'-tetramethyl-3,5,3'5'-tetrabromo-p,p'-biphenol; tetramethylbiphenol; 4,4'-dihydroxydiphenylethylmethane; 3,3'-dihydroxydiphenyldiethylmethane; 3,4'-dihydroxydiphenylmethylpropylmethane; 4,4'-dihydroxydiphenyloxide; and 4,4'-dihydroxydiphenylcyanomethane.

In another preferred aspect, the diglycidyl ether of a polyhydric phenol are selected from the diglycidyl ethers of bisphenol A, 4,4'-sulfonyldiphenol, 4,4'-oxydiphenol, 4,4'-dihydroxybenzophenone, 9,9-bis(4-hydroxyphenyl)fluorene and bisphenol F.

In another preferred aspect, the diglycidyl ether of a polyhydric phenol is the diglycidyl ether of bisphenol A.

In another preferred aspect, the water-soluble alkylene oxide branched polyhydroxyetheramine is prepared by reacting a diepoxide with one or more alkylene oxide functionalized amines and one or more amines having two reactive hydrogen atoms.

In another preferred aspect, the amine having two reactive hydrogen atoms is selected from the group consisting of amines of formula (e)-(g)

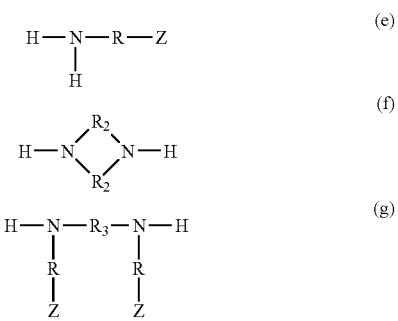

wherein R is $C_2-C_{30}$ alkylene, optionally substituted with one or more hydroxy or hydroxyalkyl groups; $R_2$ is $C_2-C_{10}$ alkylene, optionally substituted with alkylamido, hydroxy, alkoxy, halo, cyano, dialkylamine, aryloxy, alkylcarbonyl or arylcarbonyl; $R_3$ is $C_2-C_{20}$ alkylene optionally substituted with alkylamido, hydroxy, alkoxy, cyano, aryloxy, alkylcarbonyl or arylcarbonyl; and Z is hydrogen, alkylamido, hydroxy, dialkylamine, alkoxy, aryoxy, cyano, alkylcarbonyl, or arylcarbonyl.

Amines of formula (e)-(g) are available from a variety of sources including Aldrich Chemicals, Milwaukee, Wis.; Angus Chemical Company, Buffalo Grove, Ill.; Air Products and Chemicals, Inc., Allentown, Pa.; Ashland Distribution Company, Columbus, Ohio; Dow Chemical Company, Midland, Mich.; Fleming Labs, Inc., Charlotte, N.C.; Huntsman Corporation, Houston, Tex.; and others.

In another preferred aspect, R is methylene or ethylene; $R_2$ is ethylene; $R_3$ is $C_2$-$C_{20}$ alkylene optionally substituted with alkylamido, dialkylamino, hydroxy or alkoxy; and Z is alkylamido, dialkylamino, hydroxy or alkoxy.

In another preferred aspect, the amine having 2 reactive hydrogen atoms is selected from the group consisting of methylamine; ethylamine; propylamine; butylamine; sec-butylamine; isobutylamine; 3,3-dimethylbutylamine; hexylamine; benzylamine; 2-amino-1-butanol; 4-amino-1-butanol; 2-amino-2-methyl-1-propanol; 6-amino-1-hexanol; ethanolamine; propanolamine; tris(hydroxymethyl)aminomethane; 1-amino-1-deoxy-D-sorbitol; 3-amino-1,2-propanediol; 2-amino-2-methyl-1,3-propanediol; 2-amino-2-ethyl-1,3-propanediol; 3-(dimethylamino)propylamine; N,N-dimethylethylenediamine; N,N-diethylethylenediamine; 1-(2-aminoethyl)piperidine; 4-(2-aminoethyl)morpholine; 2-(2-aminoethyl)-1-methylpyrrolidine; 1-(2-aminoethyl)pyrrolidine; 2-(2-aminoethyl)pyridine; 2-(2-aminoethoxy)ethanol; 2-(2-aminoethylamino)ethanol; piperazine, 2-methylpiperazine, 2,6-dimethylpiperazine; 2,6-dimethylpiperazine; 2-(methylamido)piperazine; N,N'-bis(2-hydroxyethyl)ethylenediamine, N,N'-dimethylethylenediamine, N,N'-dimethyl-1,4-phenylenediamine and N,N'-dimethyl-1,6-hexanediamine.

In general, the highest possible amount of polyhydroxyetheramine solubilized in water is preferred. Water soluble polyhydroxyetheramine can be solubilized in water alone by cycling heating to 50 to 80° C. and cooling to room temperature over a period of time from several hours to a day. About 15 percent to 30 percent polyhydroxyetheramine solutions can be prepared using this procedure.

Alternatively, an aqueous solution of water-soluble alkylene oxide branched polyhydroxyetheramine can be prepared by reacting the polyhydroxyetheramine with one or more Bronsted acids or alkylating agents to form the quaternary ammonium salt. About 20 percent to about 50 percent aqueous solutions of polyhydroxyetheramine quaternary ammonium salt can be prepared using this method.

Suitable Bronsted acids include hydrobromic acid, hydrochloric acid, hydrofluoric acid, hydriodic acid, nitric acid, phosphoric acid, sulfuric acid, phosphorus acid, p-toluenesulfonic acid, trichloroacetic acid, dichloroacetic acid, chloroacetic acid, acetic acid, benzoic acid, stearic acid, 1,4-butanedicarboxylic acid, citric acid, benzenesulfonic acid, dinitrobenzoic acid, and the like. Acetic acid, hydrochloric and nitric acid are preferred. In general, the Bronsted acids can be present in an amount of about 1 acid group for every 1 to 30 nitrogen atoms, preferably 1 acid group for every 1 to 10 nitrogen atoms and, more preferably, 1 acid group for every 1 to 3 nitrogen atoms.

"Alkylating agents" include compounds of formula $R_{14}X$ where X is halogen, sulfate or sulfonyl and $R_{14}$ is $C_1$-$C_4$ alkyl. The alkyl group is optionally substituted with one or more hydroxy or aryl groups. Representative alkylating agents include methyl chloride, dimethyl (diethyl) sulfate, ethyl bromide, ethyl chloride, propyl bromide, propyl chloride, 2-bromoethanol, 2-chloroethanol, bromopropanol, chloropropanol, benzyl bromide, benzyl chloride, hydroxybenzyl bromide, hydroxybenzyl chloride, and the like.

In a preferred aspect, this invention is a water-soluble alkylene oxide branched polyhydroxyetheramine salt prepared by reacting a diepoxide with one or more alkylene oxide functionalized amine and one or more amines having 2 reactive hydrogen atoms and then reacting the resulting polyhydroxyetheramine with an acid or alkylating agent.

In another preferred aspect, the alkylating agent is methyl chloride or dimethyl sulfate.

The protonated polyhydroxyetheramine resulting from reaction with Bronsted acid can be neutralized with any alkali or alkaline earth metal hydroxide after it is dissolved in aqueous solution if needed. Suitable alkali or alkaline earth metal hydroxides include sodium hydroxide, potassium hydroxide, calcium hydroxide, lithium hydroxide, tetramethyl ammonium hydroxide, and the like.

Brookfield viscosity measurements at 0.56 sec$^{-1}$ show that a 15% actives aqueous solution of water-soluble alkylene oxide branched polyhydroxyetheramine can gel (24,000 cps) between about 46° C. and 62° C. (115° F. and 143.6° F.). In the oil fields in Texas, South America and the Middle East, temperatures sometimes reach 115 to 120° F. Therefore, it necessary to add a solubilizing agent to prevent the water soluble polyhydroxyetheramine from gelling in the drum when exposed to this temperature range.

Suitable solubilizing agents include water miscible solvents such as alcohols, amides, glycols, glycol ethers and other compounds that solubilize the polyhydroxyetheramine in water at temperatures where it gels without the solubilizing agent. Preferred solubilizing agents include isopropanol, butanol, 1,2-propylene glycol, ethylene glycol and hexylene glycol, N,N-dimethylformamide, N,N-dimethylacetamide, ethylene glycol butyl ether, diethylene glycol methyl ether, dipropylene glycol methyl ether, di(propylene glycol) methyl ether, propylene glycol phenyl ether, and propylene glycol methyl ether.

From about 1 to about 90 weight percent, preferably about 10 to about 30 weight percent of solubilizing agent can be added to the aqueous polyhydroxyetheramine solution. For a 15 percent aqueous polyhydroxyetheramine solution, the gellation phenomena between 46 and 62° C. is usually prevented by the addition of 10 percent of the solubilization agent. The optimum amount of solubilization agent required to minimize the gellation problem depends on which solvent is used. Preferably the lowest concentration of solubilizing agent that prevents gellation is used.

Accordingly, in another aspect, this invention is an aqueous composition comprising about 10 percent to about 50 weight percent of one or more water-soluble, alkylene oxide branched polyhydroxyetheramines and about 1 to about 90 weight percent of one or more solubilizing agents, wherein the alkylene oxide branched polyhydroxyetheramine is prepared by reacting a diepoxide and optionally one or more aliphatic or aromatic triepoxides with one or more alkylene oxide functionalized amines and one or more amines having two reactive hydrogen atoms.

In a preferred aspect, the aqueous composition comprises about 10 percent to about 50 weight percent of one or more water-soluble, alkylene oxide branched polyhydroxyetheramines and about 10 to about 30 weight percent of one or more solubilizing agents.

As discussed above, a solution of polyhydroxyetheramine in water can be prepared by adding one or more water miscible solubilizing agents to an aqueous solution of the polyhydroxyetheramine.

An aqueous polyhydroxyetheramine/solubilizing agent solution can also be prepared by synthesizing the polyhydroxyetheramine in a water miscible solvent and then diluting the reaction mixture with water. The reaction in the water miscible solvent is usually conducted under a non-oxidizing atmosphere such as a blanket of nitrogen, preferably at a temperature from about 100° C. to about 190° C., more preferably at a temperature from about 140° to 150° C. Then the water miscible solvent solution of polyhydroxyetheramine is cooled and added to water.

Suitable water miscible solvents are alcohols, amides, glycols, glycol ethers, such as isopropanol, butanol, 1,2-propylene glycol, ethylene glycol and hexylene glycol, N,N-dimethylformamide, N,N-dimethylacetamide, ethylene glycol butyl ether, diethylene glycol methyl ether, dipropylene glycol methyl ether, di(propylene glycol) methyl ether, propylene glycol phenyl ether, propylene glycol methyl ether, and the like.

Water conformance is the application of processes in reservoirs and boreholes to reduce water production and enhance oil recovery. Water conformance can be applied to locations in the well where there is a separate oil producing zone adjacent to a water producing zone, and where the reservoir has a high water saturation along with oil. It can be applied in reservoirs of different matrix. For example, water conformance can be applied to sandstone and limestone (carbonate) matrix. The water-soluble, alkylene oxide branched polyhydroxyetheramine can be used in any of these water conformance applications.

The aqueous composition comprising alkylene oxide branched polyhydroxyetheramine polymers of this invention are applied to the formation by forcing, injecting or pumping composition directly into the formation to be treated so that the polymer contacts or treats the formation or the desired portion of the formation to alter the permeability of the formation as desired.

A preferred aqueous composition for use in conformance control comprises about 0.005 percent to about 2 percent, by weight, of a water-soluble alkylene oxide branched polyhydroxyetheramine and about 0.005 to about 2 percent by weight of one or more solubilizing agents, wherein the alkylene oxide branched polyhydroxyetheramine is prepared by reacting a diepoxide and optionally one or more aliphatic or aromatic triepoxides with one or more alkylene oxide functionalized amines and one or more amines having two reactive hydrogen atoms.

The water-soluble, alkylene oxide branched polyhydroxyetheramine may be added to an aqueous salt solution commonly used to prevent clay swelling or migration. Any salt that can prevent clay swelling or migration can be used. Preferred clay stabilization salts are KCl, NaCl, NaBr and NH$_4$Cl. The concentration of the salt depends on the clay. Typical concentrations of KCl used in the field vary from about 1 to about 6 weight percent, preferably about 1 to about 2 weight percent. Typical concentrations of NaCl vary from about 10 weight percent to saturation. NaBr concentrations up to 11.4 pounds/gallon have been used. Typical concentrations of ammonium chloride vary from about 0.5 to about 2 weight percent.

The water-soluble, alkylene oxide branched polyhydroxyetheramine is added to the aqueous salt solution used to prevent clay swelling or migration at a concentration from about 0.005 weight percent to about 2 weight percent, preferably 0.02 weight percent to about 0.2 weight percent.

Accordingly, in another preferred aspect, this invention is an aqueous composition comprising about 0.005 to about 2 weight percent water-soluble, alkylene oxide branched polyhydroxyetheramine and about 1 to about 10 weight percent of one or more clay stabilization salts.

In another preferred aspect, the clay stabilization salt is selected from KCl, NaCl, NaBr and NH$_4$Cl.

Particulate material (e.g. sand, silica flour and asbestos) can also be added to or suspended in the aqueous composition.

The treatment of a subterranean formation through an oil well can be accomplished using one or more liquid spacers, preflushes or afterflushes, such as a dilute salt solution and/or an aqueous alkali metal halide solution, into the formation to pretreat or clean the formation, then injecting the aqueous composition of this invention in an amount calculated to contact the desired portion of the formation with the alkylene oxide branched polyhydroxyetheramine polymer.

Thermogravimetric analysis indicates that the water-soluble, alkylene oxide branched polyhydroxyetheramine doesn't degrade in nitrogen until it reaches a temperature of about 302° C. Therefore, the water-soluble, alkylene oxide branched polyhydroxyetheramine can provide water shut-off in wells at temperatures up to 302° C. (576° F.).

The foregoing may be better understood by reference to the following examples, which are presented for purposes of illustration and are not intended to limit the scope of this invention.

EXAMPLE 1

Water-soluble, alkylene oxide branched polyhydroxyetheramine (50.7 g, inherent viscosity of 0.18 dL/g and a Tg of 6° C., available from The Dow Chemical Company, Midland, Mich.), is dissolved in water (287.4 g) by heating to 80° C. with stirring. The mixture is then cooled to ambient temperature to give a transparent 15 percent aqueous solution of polyhydroxyetheramine.

EXAMPLE 2

The effectiveness of the water-soluble polyhydroxyetheramine water conformance polymers is measured using a Dual Core Water to Oil Ratio (WOR) test as described below.

The dual core holder apparatus consists of two 1.5" O.D.× 30" core holders with pressure taps at 3" and 15" from the injection (wellbore) end to give three pressure zones along the core length of 3", 12" and 15". The two cores are mounted parallel and connected at the injection end to a common wellbore. 150 to 300 md Berea sandstone is used as the test matrix. Five, six-inch core plugs are stacked in each cell to give 30" of length. Test conditions are 1500 psi confining pressure, 500 psi pore (back) pressure. Test temperatures are 150-250° F. The Berea cores are vacuum saturated in API standard brine solution (9% NaCl, 1% CaCl$_2$). The cores are loaded into the core holder and flooded in the "production" direction (toward the wellbore) at a low flow rate to prevent fines migration. One core stack is then flooded with a mixture of 70% Isopar G and 30% Isopar V oil. This mixture gives roughly a 2:1 mobility ratio with the brine. The flood is conducted at constant pressure of 100 psi to steady state oil rate and irreducible water saturation at that flow rate. Flow direction is reversed and both cores treated simultaneously with the WOR control treatment at 800-2000 ppm active material in 2% KCl. Treatment is conducted at constant pressure of 100 psi and the treatment volume into each core monitored with time to a total treatment volume of five total pore volumes.

Flow direction is again reversed and each core flooded independently with either oil or water depending on the saturation fluid prior to treatment. The flood is conducted at constant pressure to steady state rate. The brine-saturated core is continually flooded at low rate for 48 hours to evaluate the longevity of the treatment and its resistance to wash-off with continued flow. Calculated flow rates at 100 psi of the water and oil before and after the treatment are compared and used to calculate the WOR before and after treatment.

The test objective is to determine if product reduces WOR while minimally impacting relative oil permeability. The results are summarized in Tables 1-4 for a 15 percent aqueous solution of a water soluble polyhydroxyetheramine prepared according to the method of Example 1.

TABLE 1

Water to Oil Ratio Summary for a 2000 ppm Solution at 150° C. of Water-Soluble, Alkylene oxide branched polyhydroxyetheramine in Brine

|  | Water Rate at 100 psi | Oil Rate at 100 psi | Water-to-oil ratio |
|---|---|---|---|
| Initial | 32.2 | 14.65 | 2.2 |
| Final | 3.75 | 22.54 | 0.17 |
| Final after 48 hrs. | 2.6 | 22.54 | 0.12 |
| % Permeability Change | −91.93% | +53.86% | −94.55% |

As shown in Table 1, the water-soluble, alkylene oxide branched polyhydroxyetheramine at 2000 ppm in brine provides 91.93% water shut-off after 48 hours flow time. The WOR data shows that the decline in permeability is still continuing after the 48 hours. Finally the WOR data show that this polymer exhibits a surface active characteristic or attribute that increases the relative oil permeability following the treatment and that results in improvement in the reduction of WOR. No known commercial water conformance polymer is known to have this property apart from the compositions disclosed in commonly assigned U.S. Pat. No. 6,569,983.

TABLE 2

Water to Oil Ratio Summary Compared to a Commercial Ester-Containing Polymer

|  | Water Rate at 100 psi | Oil Rate at 100 psi | Water-to-oil ratio |
|---|---|---|---|
| Initial | 26.21 | 12.4 | 2.11 |
| After Treatment | 1.08 | 3.63 | 0.3 |
| Final after 48 hrs. | 0.86 | 3.63 | 0.24 |
| % Permeability Change | −96.7% | −70.7% | −88.62% |

Table 2 shows that a commercial ester-containing polymer (control) reduces the water rate to about 97% while reducing the oil permeability by 70.7%. The polymers of this invention do not reduce the oil permeability, instead they enhance oil flow.

TABLE 3

Water to Oil Ratio Summary at 175° F. for a 800 ppm Solution of Water-Soluble, Alkylene oxide branched polyhydroxyetheramine in Brine

|  | Water Rate At 100 psi | Oil Rate At 100 psi | Water-to-oil ratio |
|---|---|---|---|
| Initial | 37.2 | 17.58 | 2.12 |
| Final | 2.94 | 21.21 | 0.14 |
| Final after 48 hrs. | 1.55 | 21.21 | 0.07 |
| % Permeability Change | −95.83 | 20.65 | −96.7 |

As shown in Table 3, the water-soluble, alkylene oxide branched polyhydroxyetheramine at 800 ppm in brine provides 95.83% water shut-off after 48 hours flow time at 175° F. The WOR data shows that the water shut-off is still improving after 48 hours. The oil flow rate improves by 20.65%.

TABLE 4

Water to Oil Ratio Summary at 250° F. for a 800 ppm Solution of Water-Soluble, Alkylene oxide branched polyhydroxyetheramine in Brine

|  | Water Rate At 100 psi | Oil Rate At 100 psi | Water-to-oil ratio |
|---|---|---|---|
| Initial | 45.05 | 22.8 | 1.98 |
| Final | 0.88 | 23.07 | 0.04 |
| Final after 48 hrs. | N/A | 23.07 | N/A |
| % Permeability Change | −98.05 | 1.18 | −97.98 |

As shown in Table 4, the water-soluble, alkylene oxide branched polyhydroxyetheramine at 800 ppm in brine provides 98.05% water shut-off at 250° F. The WOR data shows that the water shut-off is still improving after 48 hours. The oil flow rate improved by 1.18%.

Changes can be made in the composition, operation and arrangement of the method of the invention described herein without departing from the concept and scope of the invention as defined in the claims.

The invention claimed is:

1. A method of modifying the permeability to water of a subterranean formation comprising injecting into the subterranean formation an aqueous composition comprising from about 0.005 percent to about 2 percent, by weight, of a water-soluble alkylene oxide branched polyhydroxyetheramine or a salt thereof, wherein the alkylene oxide branched polyhydroxyetheramine is prepared by reacting a diepoxide selected from the group consisting of diglycidyl ethers of polyhydric phenols with one or more alkylene oxide functionalized amines and one or more amines having two reactive hydrogen atoms and optionally reacting the resulting polyhydroxyetheramine with an acid or alkylating agent of formula $R_{14}X$ where $R_{14}$ is $C_1$-$C_4$ alkyl and X is halogen, sulfate or sulfonyl to form the salt.

2. The method of claim 1 wherein, the alkylene oxide functionalized amine is selected from the group consisting of amines of formula (a)-(d)

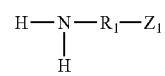

(a)

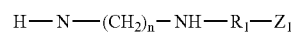

(b)

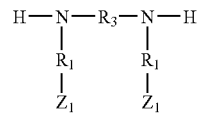

(c)

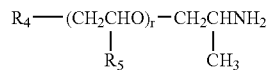

(d)

wherein
$R_1$ is independently selected at each occurrence from a group of formula $(-CH_2-CH_2-O-)_p$ and a group of formula $(-CH_2-CH(CH_3)-O-)_q$ or a mixture thereof;
$R_3$ is $C_2$-$C_{20}$ alkylene optionally substituted with alkylamido, hydroxy, alkoxy, halo, cyano, aryloxy, alkylcarbonyl or arylcarbonyl;

R₄ is alkoxy;
R₅ is H or —CH₃;
Z₁ is independently selected at each occurrence from hydrogen, C₁-C₇ alkyl and acyl; and
n, p, q and r are independently integers of 1 to about 45.

3. The method of claim 1 wherein the amine having two reactive hydrogen atoms is selected from the group consisting of amines of formula (e)-(g)

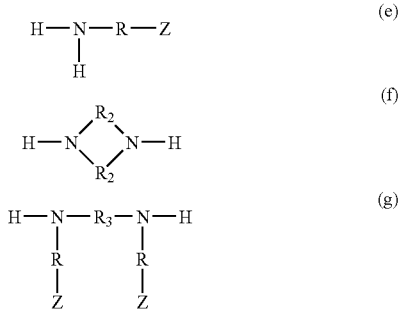

wherein
R is C₂-C₃₀ alkylene, optionally substituted with one or more hydroxy or hydroxyalkyl groups;
R₂ is C₂-C₁₀ alkylene, optionally substituted with alkylamido, hydroxy, alkoxy, cyano, dialkylamine, aryloxy, alkylcarbonyl or arylcarbonyl;
R₃ is C₂-C₂₀ alkylene optionally substituted with alkylamido, hydroxy, alkoxy, halo, cyano, aryloxy, alkylcarbonyl or arylcarbonyl; and
Z is hydrogen, alkylamido, hydroxy, dialkylamine, alkoxy, aryoxy, cyano, alkylcarbonyl, or arylcarbonyl.

4. The method of claim 3 wherein R is methylene or ethylene; R₂ is ethylene; R₃ is C₂-C₂₀ alkylene optionally substituted with alkylamido, dialkylamino, hydroxy or alkoxy; and Z is alkylamido, dialkylamino, hydroxy or alkoxy.

5. The method of claim 3 wherein the amine having 2 reactive hydrogen atoms is selected from the group consisting of methylamine; ethylamine; propylamine; butylamine; sec-butylamine; isobutylamine; 3,3-dimethylbutylamine; hexylamine; benzylamine; 2-amino-1-butanol; 4-amino-1-butanol; 2-amino-2-methyl-1-propanol; 6-amino-1-hexanol; ethanolamine; propanolamine; tris(hydroxymethyl)aminomethane; 1-amino-1-deoxy-D-sorbitol; 3-amino-1,2-propanediol; 2-amino-2-methyl-1,3-propanediol; 2-amino-2-ethyl-1,3-propanediol; 3-(dimethylamino)propylamine; N,N-dimethylethylenediamine; N,N-diethylethylenediamine; 1-(2-aminoethyl)piperidine; 4-(2-aminoethyl)morpholine; 2-(2-aminoethyl)-1-methylpyrrolidine; 1-(2-aminoethyl)pyrrolidine; 2-(2-aminoethyl)pyridine; 2-(2-aminoethoxy)ethanol; 2-(2-aminoethylamino)ethanol; piperazine, 2-methylpiperazine, 2,6-dimethylpiperazine; 2-(methylamido)piperazine; N,N'-bis(2-hydroxyethyl)ethylenediamine, N,N'-dimethylethylenediamine, N,N'-dimethyl-1,4-phenylenediamine and N,N'-dimethyl-1,6-hexanediamine.

6. The method of claim 1 wherein the diglycidyl ether of a polyhydric phenol is selected from diglycidyl ethers of resorcinol; catechol; hydroquinone; bisphenol A; bisphenol F; bisphenol E; bisphenol K; 4,4'-dihydroxydiphenyl sulfide; bisphenol S; 4,4'-thiodiphenol; 2,6-dihydroxynaphthalene; 1,4'-dihydroxynapthalene; 9,9-bis(4-hydroxyphenyl)fluorene; dihydroxy dinitrofluorenylidene; diphenylene; 2,2-bis(4-hydroxyphenyl)-acetamide; 2,2-bis(4-hydroxyphenyl)ethanol; 2,2-bis(4-hydroxyphenyl)-N-methylacetamide; 2,2-bis(4-hydroxyphenyl)-N,N-dimethylacetamide; 3,5-dihydroxyphenyl-acetamide; 2,4-dihydroxyphenyl-N-(hydroxyethyl)-acetamide; 2,2-bistris-hydroxyphenyl methane; 2,6,2',6'-tetrabromo-p,p'-bisphenol A; 2,6,2',6'-tetramethyl-3,5,3'-tribromo-p,p'-biphenol; 2,6,2',6'-tetramethyl-3,5,3'5'-tetrabromo-p,p'-biphenol; tetramethylbiphenol; 4,4'-dihydroxydiphenylethylmethane; 3,3'-dihydroxydiphenyldiethylmethane; 3,4'-dihydroxydiphenylmethylpropylmethane; 4,4'-dihydroxydiphenyloxide; and 4,4'-dihydroxydiphenylcyanomethane.

7. The method of claim 1 wherein the diglycidyl ether of a polyhydric phenol is selected from the diglycidyl ethers of bisphenol A, 4,4'-sulfonyldiphenol, 4,4'-oxydiphenol, 4,4'-dihydroxybenzophenone, 9,9-bis(4-hydroxyphenyl)fluorene and bisphenol F.

8. The method of claim 1 wherein the diglycidyl ether of a polyhydric phenol is the diglycidyl ether of bisphenol A.

9. The method of claim 1 wherein the water-soluble alkylene oxide branched polyhydroxyetheramine comprises secondary amine, tertiary amine or ditertiary amine end groups.

10. The method of claim 9 wherein the water-soluble alkylene oxide branched polyhydroxyetheramine comprising secondary amine, tertiary amine or ditertiary amine end groups is prepared by reacting the diepoxide selected from the group consisting of diglycidyl ethers of polyhydric phenols with one or more alkylene oxide functionalized amines and one or more amines having two reactive hydrogen atoms to form the water-soluble alkylene oxide branched polyhydroxyetheramine and then reacting the water-soluble alkylene oxide branched polyhydroxyetheramine with one or more amines having one or two reactive hydrogen atoms.

11. The method of claim 9 wherein the water-soluble alkylene oxide branched polyhydroxyetheramine comprising secondary amine, tertiary amine or ditertiary amine end groups is prepared by reacting the diepoxide selected from the group consisting of diglycidyl ethers of polyhydric phenols with one or more alkylene oxide functionalized amines and one or more amines having two reactive hydrogen atoms and an amine having 3 or more reactive hydrogen atoms to form the water-soluble alkylene oxide branched polyhydroxyetheramine and then reacting the water-soluble alkylene oxide branched polyhydroxyetheramine with one or more amines having one or two reactive hydrogen atoms.

12. The method of claim 1 wherein the water-soluble alkylene oxide branched polyhydroxyetheramine is prepared by reacting a mixture of the diepoxide selected from the group consisting of diglycidyl ethers of polyhydric phenols and one or more aliphatic or aromatic triepoxides with one or more alkylene oxide functionalized amines, one or more amines having two reactive hydrogen atoms to impart cross linking.

13. The method of claim 1 wherein the water-soluble alkylene oxide branched polyhydroxyetheramine salt is prepared by reacting a mixture of the diepoxide selected from the group consisting of diglycidyl ethers of polyhydric phenols and one or more aliphatic or aromatic triepoxides, one or more alkylene oxide functionalized amines, one or more amines having two reactive hydrogen atoms to impart cross linking and then an acid or alkylating agent.

14. The method of claim 1 wherein the aqueous composition further comprises about 1 to about 10 weight percent of one or more clay stabilization salts.

15. The method of claim 14 wherein the clay stabilization salts are selected from KCl, NaCl, NaBr, sodium acetate and NH₄Cl.

* * * * *